United States Patent [19]
Everson

[11] Patent Number: 6,089,429
[45] Date of Patent: Jul. 18, 2000

[54] VEHICULAR EXTENDED STORAGE UNIT

[76] Inventor: Sheldon E. Everson, 1009 Cardinal St., Bangor, Wis. 54614

[21] Appl. No.: 09/258,336

[22] Filed: Feb. 25, 1999

[51] Int. Cl.⁷ ........................................................ B60R 9/00
[52] U.S. Cl. .......................... 224/404; 224/281; 224/402; 224/403; 224/541; 224/542; 296/37.6
[58] Field of Search .................................. 224/404, 402, 224/403, 281, 541, 542; 296/37.6; D12/423, 424; D3/905

[56] References Cited

U.S. PATENT DOCUMENTS

| | | | |
|---|---|---|---|
| D. 373,989 | 9/1996 | Dickinson | D12/414.1 |
| 2,722,352 | 11/1955 | Dehnel | 224/539 |
| 4,126,349 | 11/1978 | Nelson et al. | 296/24.1 |
| 4,848,626 | 7/1989 | Waters | 224/404 |
| 4,892,346 | 1/1990 | Berlin | 296/37.6 |
| 4,967,944 | 11/1990 | Waters | 224/404 |
| 5,088,636 | 2/1992 | Barajas | 224/281 |
| 5,299,722 | 4/1994 | Cheney | 224/404 |
| 5,439,150 | 8/1995 | Trahms | 224/404 |
| 5,685,593 | 11/1997 | O'Connor | 296/39.2 |

*Primary Examiner*—Gregory M. Vidovich
*Assistant Examiner*—Maerena W. Brevard

[57] ABSTRACT

A container is provided including a housing having a lower extent and an upper extent. The upper extent has a length greater than that of the lower extent to define a pair of side extents one of which extends from the housing further than a second one of the side extents. Also included is a cabinet and at least one cubbyhole for storing various items within the housing. Both the cabinet and the cubbyhole each have a locking mechanism for precluding unauthorized access thereto.

8 Claims, 3 Drawing Sheets

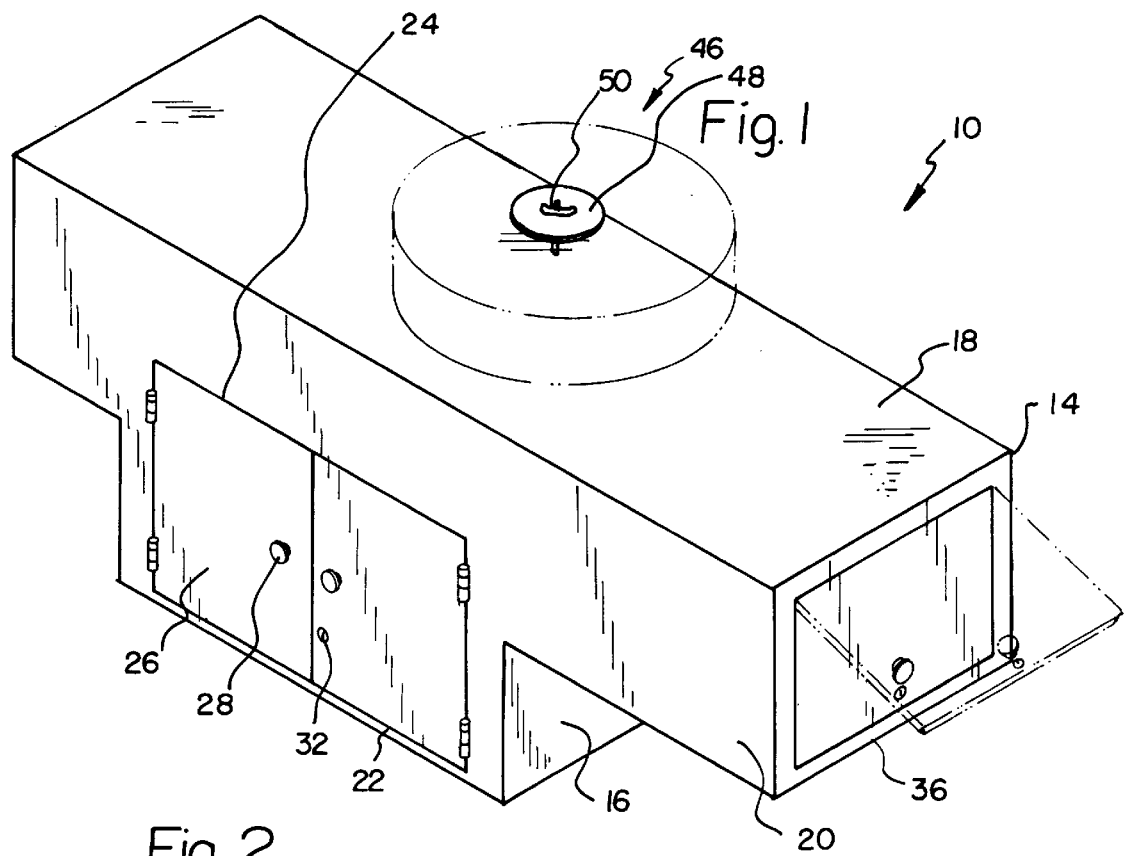
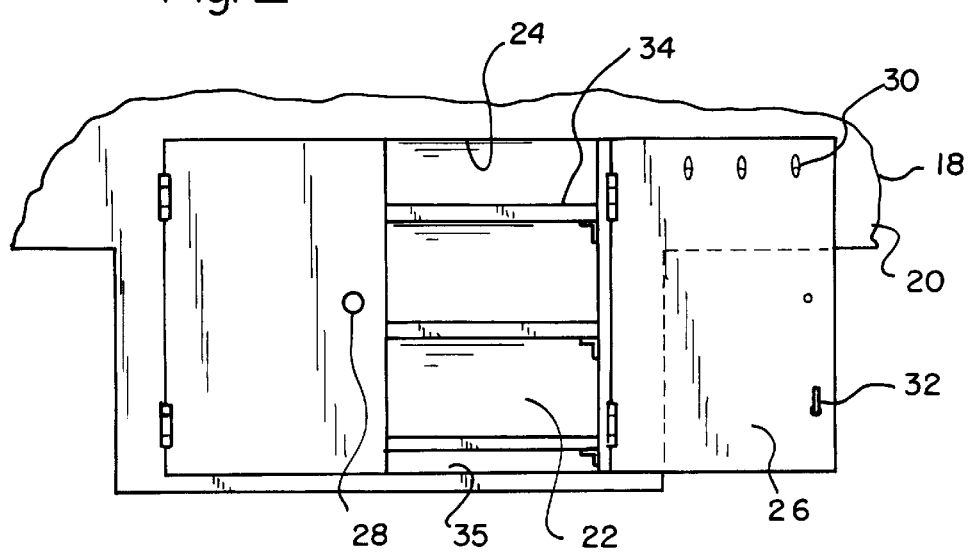

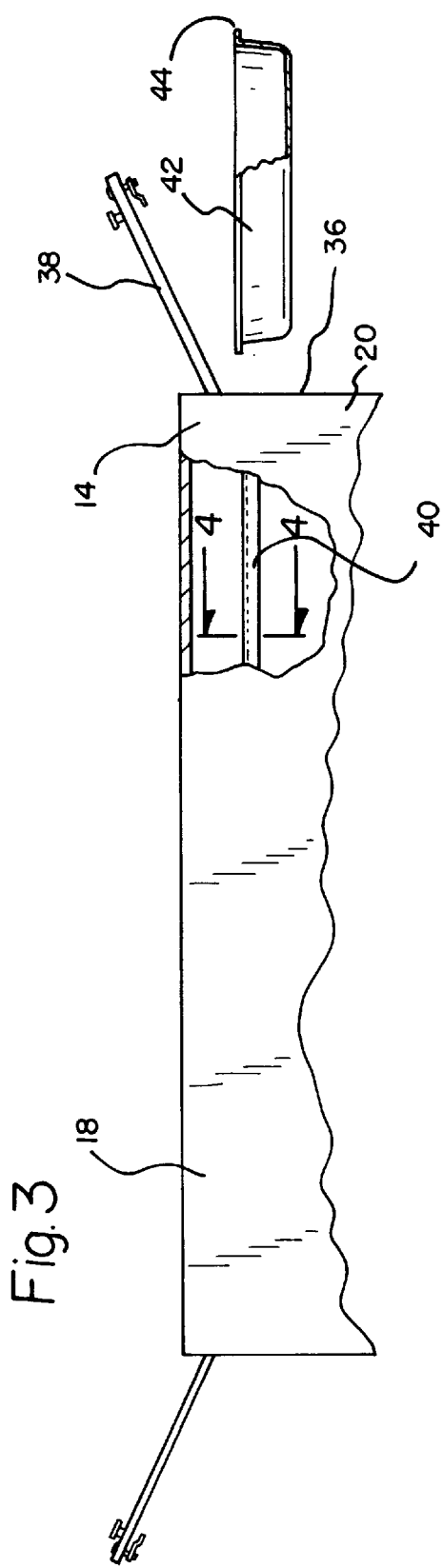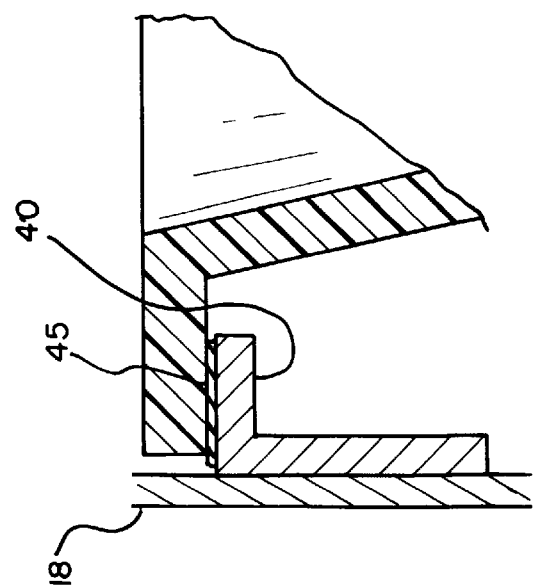

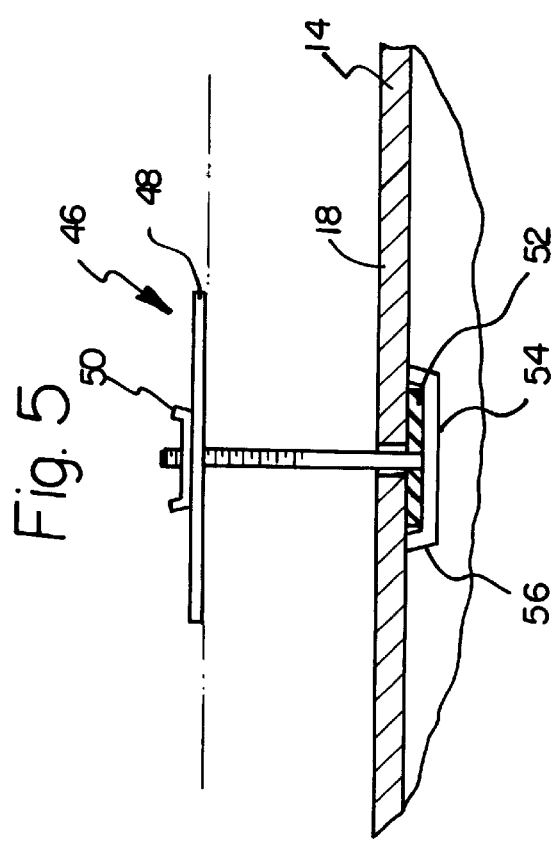
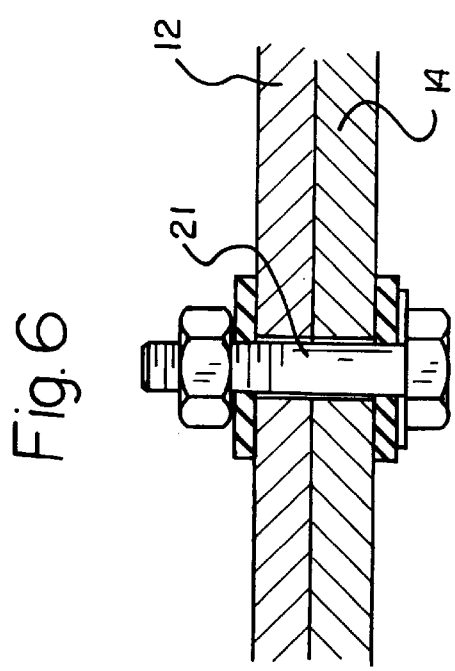

VEHICULAR EXTENDED STORAGE UNIT

BACKGROUND OF THE INVENTION

1. Field of the Invention

The present invention relates to truck bed storage facilities and more particularly pertains to a new vehicular extended storage unit for providing a container that is shaped to reside within a truck bed already equipped with a hydraulic unit therein.

2. Description of the Prior Art

The use of truck bed storage facilities is known in the prior art. More specifically, truck bed storage facilities heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,685,593; U.S. Pat. No. 5,439,150; U.S. Pat. Des. 373,989; U.S. Pat. No. 4,848,626; U.S. Pat. No. 5,299,722; and U.S. Pat. No. 2,722,352.

In these respects, the vehicular extended storage unit according to the present invention substantially departs from the conventional concepts and designs of the prior art, and in so doing provides an apparatus primarily developed for the purpose of providing a container that is shaped to reside within a truck bed already equipped with a hydraulic unit therein.

SUMMARY OF THE INVENTION

In view of the foregoing disadvantages inherent in the known types of truck bed storage facilities now present in the prior art, the present invention provides a new vehicular extended storage unit construction wherein the same can be utilized for providing a container that is shaped to reside within a truck bed already equipped with a hydraulic unit therein.

The general purpose of the present invention, which will be described subsequently in greater detail, is to provide a new vehicular extended storage unit apparatus and method which has many of the advantages of the truck bed storage facilities mentioned heretofore and many novel features that result in a new vehicular extended storage unit which is not anticipated, rendered obvious, suggested, or even implied by any of the prior art truck bed storage facilities, either alone or in any combination thereof.

To attain this, the present invention is adapted for use with a truck including a bed defined by a planar rectangular bottom face and a side wall coupled to a periphery of the bottom face and extending upwardly therefrom. The side wall of the truck bed includes a pair of short end faces and a pair of elongated side faces. The present invention includes a housing having a lower extent defined by a planar rectangular bottom wall having a length less than a width of the bed of the truck. A side wall of the lower extent extends upwardly from the bottom wall and includes a rear face, a front face and a pair of side faces. The housing further includes an upper extent defined by a top wall with a length greater than that of the bottom wall of the lower extent and a width equal to that of the bottom wall of the lower extent. The upper extent of the housing includes a side wall depending from the top wall such that a front face and a rear face of the upper extent is integrally coupled to that of the lower extent in coplanar relationship therewith. As such, a pair of side extents extend laterally beyond the lower extent. Ideally, a first one of the side extents is longer than a second one of the side extents for reasons that will soon become apparent. In use, the lower extent of the housing is adapted for being selectively positioned within the bed of the truck adjacent one of the end faces. As such, the side extents of the housing extend beyond the side faces of the bed of the truck. FIGS. 1 & 2 best show a cabinet defined by a cut out formed in the rear face of the side wall of the upper extent and the lower extent of the housing. A pair of planar doors are hingably coupled to opposite side edges of the cut out for allowing selective access to a compartment within an interior space of the housing. Each door has a knob centrally positioned on an outboard edge of an outer surface thereof. Further, a plurality of linearly aligned hooks are mounted along an upper edge of an inner surface of each door. One of the doors has a key actuated locking mechanism mounted below the knob thereof. The locking mechanism is thus adapted for selectively engaging the remaining door in order to preclude the opening thereof. As shown best in FIG. 2, the compartment of the cabinet has a plurality of vertically spaced horizontal shelves each with a length equal to that of the cut out for supporting various items thereon. Also included is a cubbyhole having a cut out formed in a side face of the first side extent of the housing. A lid is provided with a top edge hingably mounted to a top edge of the cut out. For allowing manual access to the cubbyhole, a knob is mounted on a central extent of a bottom edge of an outer surface of the lid. The lid of the cubbyhole has a key actuated locking mechanism mounted below the knob thereof for selectively engaging the first side extent in order to preclude the opening thereof. As shown in FIGS. 3 & 4, the front face and the rear face of the upper extent of the housing each have a horizontally oriented guide with an inverted L-shaped cross-section mounted thereon. Also included is a removable tray that is defined by a bottom and a side wall coupled to a periphery of the bottom for defining an open top. Such open top is equipped with an outwardly extending peripheral flange for being slid along the guides of the cubbyhole. Finally, a spare tire holder is provided including a vertically oriented bolt having a bottom end fixedly mounted to a central extent of the top wall of the upper extent of the housing. A planar circular plate is equipped with a central aperture for slidably receiving the bolt. Lastly, a wing nut is screwably engaged with the bolt for forcing the plate downwardly upon a tire selectively positioned between the plate and the top wall of the upper extent of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicular extended storage unit apparatus and method which has many of the advantages of the truck bed storage facilities mentioned heretofore and many novel features that result in a new vehicular extended storage unit which is not anticipated, rendered obvious, suggested, or even implied by any of the prior art truck bed storage facilities, either alone or in any combination thereof.

It is another object of the present invention to provide a new vehicular extended storage unit which may be easily and efficiently manufactured and marketed.

It is a further object of the present invention to provide a new vehicular extended storage unit which is of a durable and reliable construction.

An even further object of the present invention is to provide a new vehicular extended storage unit which is susceptible of a low cost of manufacture with regard to both materials and labor, and which accordingly is then susceptible of low prices of sale to the consuming public, thereby making such vehicular extended storage unit economically available to the buying public.

Still yet another object of the present invention is to provide a new vehicular extended storage unit which provides in the apparatuses and methods of the prior art some of the advantages thereof, while simultaneously overcoming some of the disadvantages normally associated therewith.

Still another object of the present invention is to provide a new vehicular extended storage unit for providing a container that is shaped to reside within a truck bed already equipped with a hydraulic unit therein.

Even still another object of the present invention is to provide a new vehicular extended storage unit that includes a housing having a lower extent and an upper extent. The upper extent has a length greater than that of the lower extent to define a pair of side extents one of which extends from the housing further than a second one of the side extents. Also included is a cabinet and at least one cubbyhole for storing various items within the housing. Both the cabinet and the cubbyhole each have a locking mechanism for precluding unauthorized access thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new vehicular extended storage unit according to the present invention.

FIG. 2 is a rear view of the present invention showing the cabinet thereof.

FIG. 3 is a rear view of the present invention showing the cubbyhole and tray thereof.

FIG. 4 is a cross-sectional view of the present invention taken along line 4—4 shown in FIG. 3.

FIG. 5 is a cross-sectional view of the present invention showing the spare tire holder in detail.

FIG. 6 is a cross-sectional view of the interconnection of the truck bed and the housing of the container of the present invention.

DESCRIPTION OF THE PREFERRED EMBODIMENT

With reference now to the drawings, and in particular to FIGS. 1 through 6 thereof, a new vehicular extended storage unit embodying the principles and concepts of the present invention and generally designated by the reference numeral 10 will be described.

The present invention, designated as numeral 10, is adapted for use with a truck 12 including a bed defined by a planar rectangular bottom face and a side wall coupled to a periphery of the bottom face and extending upwardly therefrom. The side wall of the truck bed includes a pair of short end faces and a pair of elongated side faces.

The present invention is a container that includes a housing 14 having a lower extent 16 defined by a planar rectangular bottom wall having a length less than a width of the bed of the truck. A side wall of the lower extent extends upwardly from the bottom wall and includes a rear face, a front face and a pair of side faces.

The housing further includes an upper extent 18 defined by a top wall with a length greater than that of the bottom wall of the lower extent and a width equal to that of the bottom wall of the lower extent. The upper extent of the housing further includes a side wall depending from the top wall such that a front face and a rear face of the side wall of the upper extent is integrally coupled to that of the lower extent in coplanar relationship therewith.

As such, a pair of side extents 20 extend laterally beyond the lower extent. A first one of the side extents is at least twice as long as that of a second one of the side extents for reasons that will soon become apparent. Ideally, the first side extent is 25 inches in length and the second side extent is 4 inches in length. Further, a height of the first side extent is less than that of the second side extent, preferably a difference of 8 inches.

In use, the lower extent of the housing is adapted for being selectively positioned within the bed of the truck adjacent one of the end faces. As such, the side extents of the housing extend beyond the side faces of the bed of the truck. Overall, the upper extent of the housing has a length of 71 inches while the lower extent has a length of 41 inches. By this structure, the housing is ideally dimensioned such that the first side extent resides above a hydraulic unit that is installed within the truck. To prevent the housing from shifting within the bed of the truck, both the housing and the truck bed preferably have aligned holes formed therein through which bolts 21 may be secured. As shown in FIG. 6, elastomeric bushings may be positioned between the bolt and the housing and truck bed for affording a tight fit with minimal vibration.

FIGS. 1 & 2 best show a cabinet 22 defined by a cut out 24 formed in the rear face of the side wall of the upper extent and the lower extent of the housing. A pair of planar doors 26 are hingably coupled to opposite side edges of the cut out for allowing selective access to a compartment within an interior space of the housing. Each door has a knob 28 centrally positioned on an outboard edge of an outer surface thereof. Further, a plurality of linearly aligned hooks 30 are mounted along an upper edge of an inner surface of each door. Ideally, such hooks face towards the cabinet. One of the doors has a key actuated locking mechanism 32 mounted below the knob thereof. The locking mechanism is adapted for selectively engaging the remaining door in order to preclude the opening thereof. As an option, the outer surfaces of the doors may be equipped with latches which engage a clip or the like on the side extents of the housing to maintain the door in an open orientation. By this feature, tools positioned on the hooks may be maintained easily accessible.

As shown best in FIG. 2, the compartment of the cabinet has a plurality of optional removable vertically spaced horizontal shelves 34 each with a length equal to that of the cut out for supporting various items thereon. Each of the shelves are preferably positioned at selected heights by removable shelf brackets. Further, the cut out 24 preferably has an inwardly extending lip 35 for preventing the shelves from sliding out when the doors are opened and the truck is positioned on an incline.

Also included is a cubbyhole 36 having a cut out formed in a side face of the first side extent of the housing. A lid 38 is provided with a top edge hingably mounted to a top edge of the cut out. For allowing manual access to the cubbyhole, a knob is mounted on a central extent of a bottom edge of an outer surface of the lid. The lid of the cubbyhole has a key actuated locking mechanism mounted below the knob thereof for selectively engaging the first side extent in order to preclude the opening thereof. It should be noted that the aforementioned locking mechanisms may include a rotatable latch which is releasably inserted within a slot formed in one of the doors or the housing. In the alternative, any other type of locking mechanism may be employed.

As shown in FIGS. 3 & 4, the front face and the rear face of the upper extent of the housing each have a horizontally oriented guide 40 with an inverted L-shaped cross-section mounted thereon. Also included is a removable tray 42 that is defined by a bottom and a side wall coupled to a periphery of the bottom for defining an open top. Such open top is equipped with an outwardly extending peripheral flange 44 for being slid along the guides of the cubbyhole. To facilitate such sliding, an upper surface of the guides and a lower surface of the peripheral flange of the tray are lined with nylon 45.

Ideally, a pair of trays are removably mounted within the first side extent. Further, a lid is preferably positioned on the second side extent for allowing access to another cubbyhole. As an option, such second cubbyhole may also be equipped with trays. It should be noted that each of the cubbyholes are separated with respect to each other and with respect to the compartment by internal dividers and the like.

Finally, a spare tire holder 46 is provided including a vertically oriented bolt having a bottom end fixedly mounted to a central extent of the top wall of the upper extent of the housing. A planar circular plate 48 is equipped with a central aperture for slidably receiving the bolt. Lastly, a wing nut 50 is screwably engaged with the bolt for forcing the plate downwardly upon a tire selectively positioned between the plate and the top wall of the upper extent of the housing. As shown in FIG. 5, a bottom end of the aforementioned bolt extends freely through a hole in the housing and has an enlarged planar elastomeric washer 52 mounted thereon. This washer is fitted within a slot defined by a plate 54 mounted to an inner surface of the housing and coupled thereto via a peripheral lip 56. Note FIG. 5.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A container for use with a truck including a bed defined by a planar rectangular bottom face and a side wall coupled to a periphery of the bottom face and extending upwardly therefrom wherein the side wall includes a pair of short end faces and a pair of elongated side faces, the container comprising:

a housing including a lower extent defined by a planar rectangular bottom wall having a length less than a width of the bed of the truck and a side wall extending upwardly therefrom including a rear face, a front face and a pair of side faces, the housing further including an upper extent defined by a top wall with a length greater than that of the bottom wall of the lower extent and a width equal to that of the bottom wall of the lower extent and a side wall depending from the top wall such that a front face and a rear face of the upper extent are integrally coupled to that of the lower extent in coplanar relationship to define a pair of side extents extending laterally beyond the lower extent wherein a first one of the side extents is longer than a second one of the side extents, wherein the lower extent of the housing is adapted for being selectively positioned within the bed of the truck adjacent one of the end faces with the side extents of the housing extending beyond the side faces of the bed of the truck;

a cabinet defined by a cut out formed in the rear face of the side wall of the upper extent and the lower extent of the housing with a pair of planar doors hingably coupled to opposite side edges of the cut out for allowing selective access to a compartment within an interior space of the housing, each door having a knob centrally positioned on an outboard edge of an outer surface thereof and having a plurality of linearly aligned hooks mounted along an upper edge of an inner surface thereof, one of the doors having a key actuated locking mechanism mounted below the knob thereof for selectively engaging the remaining door in order to precluding the opening thereof, the compartment of the cabinet having a plurality of vertically spaced horizontal shelves each with a length equal to that of the cut out for supporting various items thereon;

a cubbyhole including a cut out formed in a side face of the first side extent of the housing and including a lid with a top edge hingably mounted to a top edge of the cut out and a knob mounted on a central extent of a bottom edge of an outer surface of the lid, the lid of the cubbyhole having a key actuated locking mechanism mounted below the knob thereof for selectively engaging the first side extent in order to preclude the opening thereof, the front face and the rear face of the upper extent of the housing each having a horizontally oriented guide with an inverted L-shaped cross-section mounted thereon, wherein a removable tray is included defined by a bottom and a side wall coupled to a periphery of the bottom for defining an open top with an outwardly extending peripheral flange for being slid along the guides of the cubbyhole; and a spare tire holder including a vertically oriented bolt having a bottom end fixedly mounted to a central extent of the top wall of the upper extent of the housing, a planar circular plate with a central aperture for slidably receiving the bolt, and a wing nut screwably engaged with the bolt for forcing the plate downwardly upon a tire selectively positioned between the plate and the top wall of the upper extent of the housing.

2. A container comprising:

a housing including a lower extent and an upper extent having a length greater than that of the lower extent to define a pair of side extents one of which extends from the lower extent further than a second one of the side extents, wherein a spare tire holder is mounted on a top wall of the upper extent; and a cabinet formed in a rear wall of the housing with at least one door pivotally mounted on the rear wall with a locking mechanism for allowing selective access to an interior space of the housing to authorized personnel only.

3. A container as set forth in claim 2 wherein the cabinet has a plurality of shelves mounted therein.

4. A container as set forth in claim 2 wherein the spare tire holder includes a bolt mounted on the top wall of the housing and extending upwardly, a plate with an aperture for slidably receiving the bolt, and a nut screwably engaged with the bolt for forcing the plate downwardly upon a tire selectively positioned between the plate and the top wall of the upper extent of the housing.

5. A container for use with a truck including a bed comprising:

a housing including a lower extent and an upper extent having a length greater than that of the lower extent to define a pair of side extents one of which extends from the lower extent substantialy further than a second one of the side extents; and a cubbyhole formed in a side face of at least one of the side extents of the housing with at least one door pivotally mounted on the housing over the cubbyhole with a locking mechanism for allowing selective access to an interior space of the housing to authorized personnel only.

6. A container as set forth in claim 5 wherein the cubbyhole has a tray slidably inserted therein.

7. A container as set forth in claim 5 wherein a spare tire holder is mounted on a top wall of the upper extent of the housing.

8. A container as set forth in claim 7 wherein the spare tire holder includes a bolt mounted on the top wall of the housing and extending upwardly, a plate with a central aperture for slidably receiving the bolt, and a nut screwably engaged with the bolt for forcing the plate downwardly upon a tire selectively positioned between the plate and the top wall of the upper extent of the housing.

* * * * *